Inventor

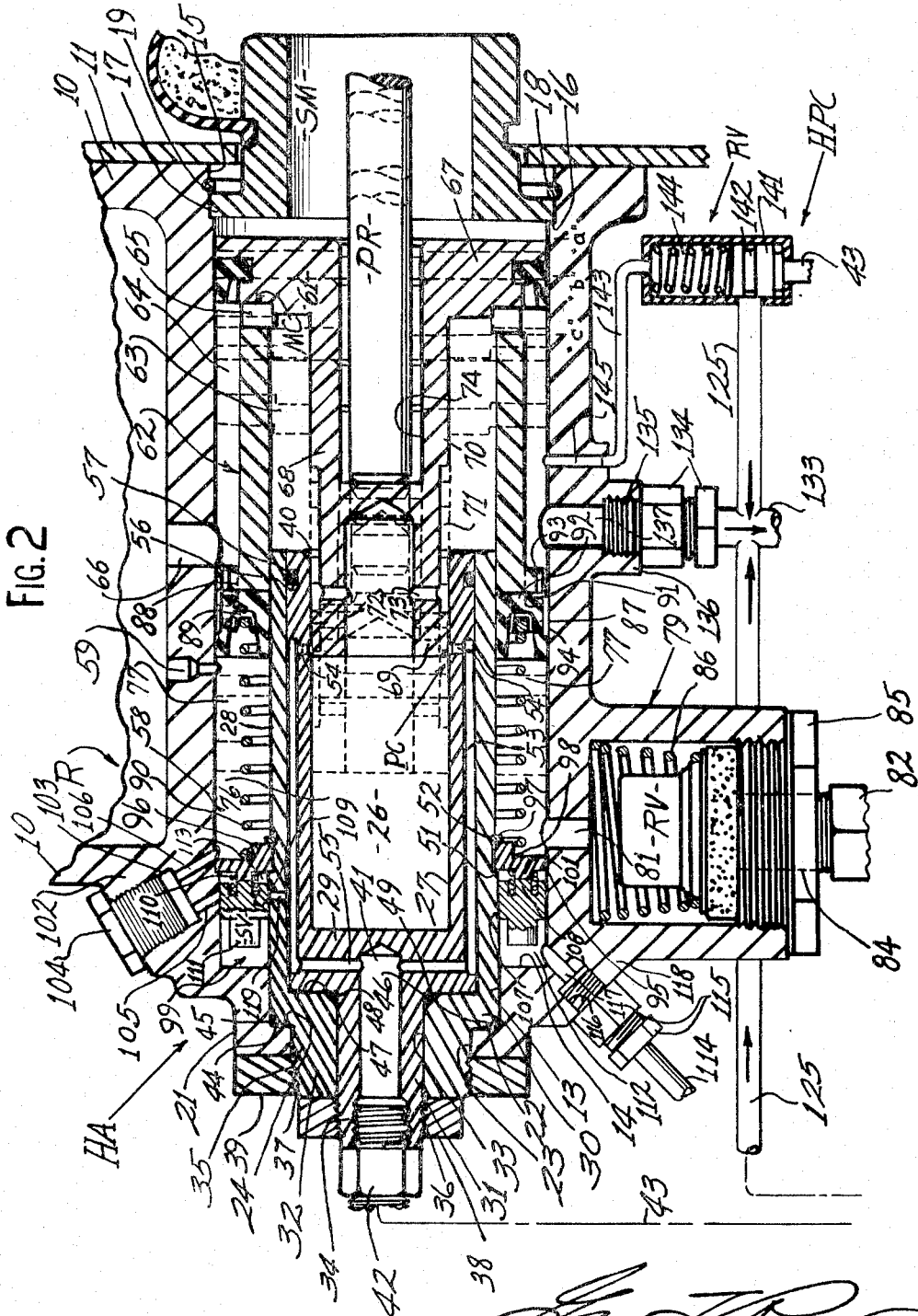

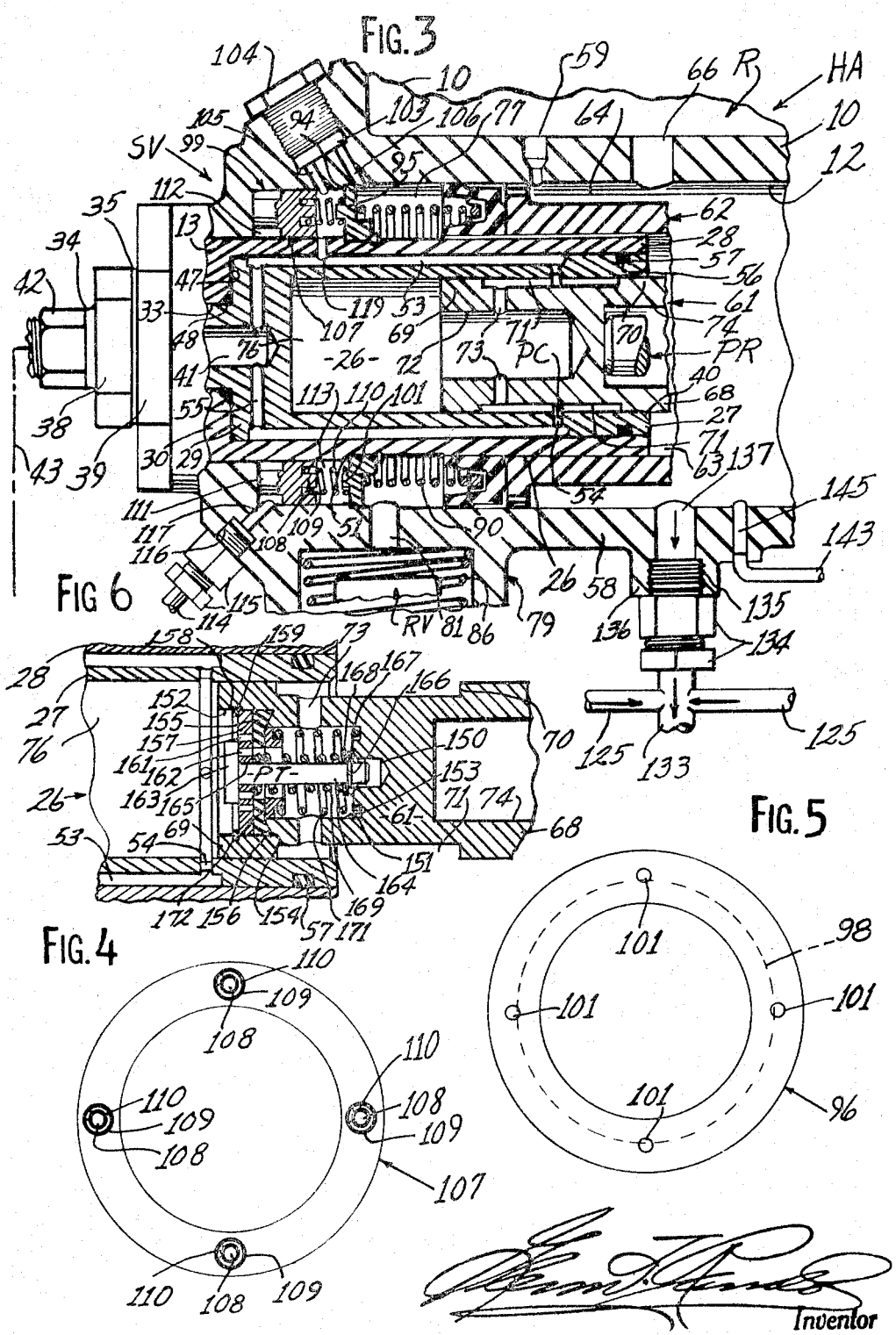

United States Patent Office 3,321,055
Patented May 23, 1967

3,321,055
DUAL-CYLINDER HYDRAULIC ACTUATOR
FOR AUTOMOTIVE CLUTCH AND BRAKE
CONTROL
Glenn T. Randol, 3 E. 2nd Ave., Loch Lynn,
Mountain Lake Park, Md. 21550
Filed Aug. 20, 1964, Ser. No. 390,937
20 Claims. (Cl. 192—13)

My invention relates generally to duplex fluid pressure systems incorporating a dual-cylinder hydraulic actuator of the general character disclosed in my copending U.S. application Ser. No. 276,634 filed Apr. 29, 1963 now issued as Patent No. 3,203,187 dated August 31, 1965, the invention having particular reference to a novel and improved dual master cylinder for actuating the service brakes on automotive vehicles and the like, and for selective power and manual declutching of the conventional spring-engageable master friction clutch, respectively, to facilitate controlling such vehicle when equipped with a manual-shift transmission.

The primary object of the present invention is the provision of a novel and improved dual-cylinder hydraulic actuator adapted to control power-disengagement of the vehicle main clutch, manual service braking operations accompanied by automatic re-engagement of the clutch to provide supplemental engine-compression braking, and operator operation of the service brakes and disengagement of the clutch to release the manual-shift transmission for neutral setting to facilitate starting the engine, when the drive line is under coasting-load drive resulting from "roll" of the car while parked "in-gear" on a gradient, for example, or otherwise moved when the engine is "off" and brakes released; said power-disengagement, braking operations and combined braking and declutching operations being controllable by a single control member such as the brake-pedal in response to selective ranges of movement thereof from "normal" position wherein the brakes are released and the clutch fully engaged.

An important object of the invention related to the primary objective above is the provision in such a dual-cylinder actuator of means whereby operator force alone can be employed to hydraulically apply the service brakes and disengage the main clutch in the event the manual-shift transmission is locked "in-gear" as a result of coasting-load torque imposed on the drive line from compression effect reaction when the engine is not running, thus enabling neutral setting of the transmission to release the engine for starting, and wherein the dual-cylinders are effective automatically and jointly to provide adequate fluid displacement for actuating both the clutch and brakes in response to the final range of depressing movement of the operator-operated member.

A further object is to provide a dual-cylinder unit of the character just referred to wherein the dual-cylinders are arranged in concentric overlapping relationship to produce with their respective fluid-displacement members (pistons), an annular and a cylindrical pressure-working chamber, respectively, said working chambers being operative independently in response to a fluid pressure-activated valve and to fluid-controlling portions cooperable between one of said cylinders and its associated displacement member to sequentially effect hydraulic-power disengagement of the vehicle main clutch and operator-operation of the service brakes accompanied by re-engagement of the clutch to provide braking assistance from engine-compression, said working chambers being operative jointly in response to said valve operated to a different position interconnecting said working chambers and a different fluid-controlling portion on the one displacement member cooperating with one of the portions on the one cylinder, to enable said latter member to displace fluid simultaneously with the other displacement member to apply the service brakes and effect the said declutching operation.

An object more specifically related to the foregoing objects is the provision of a dual-cylinder hydraulic unit arranged in concentric overlapping relationship, and a pair of displacement members reciprocably disposed in said cylinders, respectively, to produce a pair of variable pressure-working chambers therewith, the outer cylinder being of annular configuration and the inner cylinder of cylindrical configuration with both cylinders in continuous communication with a gravity-type supply reservoir via a common intake port, and wherein an engine-driven hydraulic pump is connected to receive fluid from said reservoir and displace the same under pressure into a hydraulic servo adapted to effect declutching upon initial movement of the control member from normally released position and thereby blocking non-activating flow of the fluid, additional movement of said control member in the same direction being effective through cooperating fluid-controlling passages between said inner cylinder and its cooperating displacement member, to cut off pump pressure from said clutch-servo and connect the pump to the reservoir for idle non-activating circulation of the fluid from and to said reservoir to accommodate clutch re-engagement during normal service brake operations under control of the outer displacement member, thus avoiding "free-wheeling" of the vehicle under sole control of the service brakes.

A further more specific object of the invention is to provide a declutching operation by operator force alone when the engine is "off" and the transmission "in-gear" as when parking on a gradient with the brakes released, to facilitate neutral setting of the transmission so that the engine can be released for starting, such operator force being transmitted through the final range of movement of the control member from normal position, to connect the outer and inner cylinders to the clutch-servo, and thereby providing adequate fluid displacement into the brake actuating wheel cylinders and the clutch-servo, to apply the service brakes and effect declutching, whereupon release of the control member to normal position takes the brakes "off" and enables spring-engagement of the main clutch with the transmission in neutral setting in readiness for starting the engine and normal starting of the vehicle by initially depressing and releasing the control member to effect power-disengagement, respectively, and re-engagement of the vehicle main clutch.

Another object is to utilize in a novel manner the engine-driven lubricating pump for supplying the actuating fluid to the clutch-servo during normal power-operation of the clutch in response to initial movement of the personally-actuated control member, and wherein the engine sump oil would also supply the dual-cylinder reservoir. Optionally, a separate pump with its own supply reservoir, driven from the drive shaft of the engine lubricating pump, would be utilized to effect declutching operations without disturbing the normal pressure lubricating function of the engine oil pump. In either case the declutching pump would also serve the additional function of selectively conditioning the outer cylinder to solely apply the service brakes thus serving as the normal master cylinder operation therefor, or to enable the outer cylinder to cooperate with the inner cylinder to provide joint fluid displacement to apply the service brakes and effect the declutching operation under operator-actuation of said control member in its final range of movement so that coasting-load torque on the engine resulting from engine-compression reaction on the drive line, can be relieved for starting the engine should the operator release the parking brake or fail to apply it when parking the car "in-gear" on a gradient which condition could lock the manual shift-lever in its "in-gear" setting should the car "roll," thus rendering the car inoperative until the engine can be released to enable neutral setting of the shift-lever. Accordingly, since the pump is driven at speeds proportional to engine speed therefore in accordance with torque output, the pump may be termed a "speed-responsive device" for selectively controlling the outer cylinder to solely apply the service brakes or work in conjunction with the inner cylinder to take the manual-shift transmission off the "hook" so that normal control of the vehicle can be taken over by the driver.

A still further object of my invention is to utilize the engine-driven power steering pump for actuating the clutch-servo during normal power-operation of the vehicle clutch under control of the aforesaid control member, and wherein the supply reservoir for the dual-cylinder actuator would serve for both power-declutching and steering thus eliminating the conventional supply reservoir for the latter.

Other objects and advantages will become apparent to persons skilled in the art to which the invention relates, in the course of the following description of preferred embodiments illustrated by way of examples in the accompanying drawing, and in which:

FIGURE 2 is a fragmentary enlargement of a portion of FIGURE 1 showing the relative positions of the parts corresponding to hydraulic-power disengagement of the main clutch effective prior to service brake operation;

FIGURE 3 is another fragmentary enlargement of a portion of FIGURE 1 on the same scale as FIGURE 2, but showing the relative positions of the parts corresponding to disengagement of the main clutch and operation of the service brakes in response to operator force alone;

FIGURE 4 is a view of the spring-biased side of the annular shut-off valve between the dual-cylinders, and which is operative by hydraulic pressure to isolate the brake-actuating cylinder from the clutch-actuating cylinder during normal power-declutching and operator-braking operations;

Figure 1:
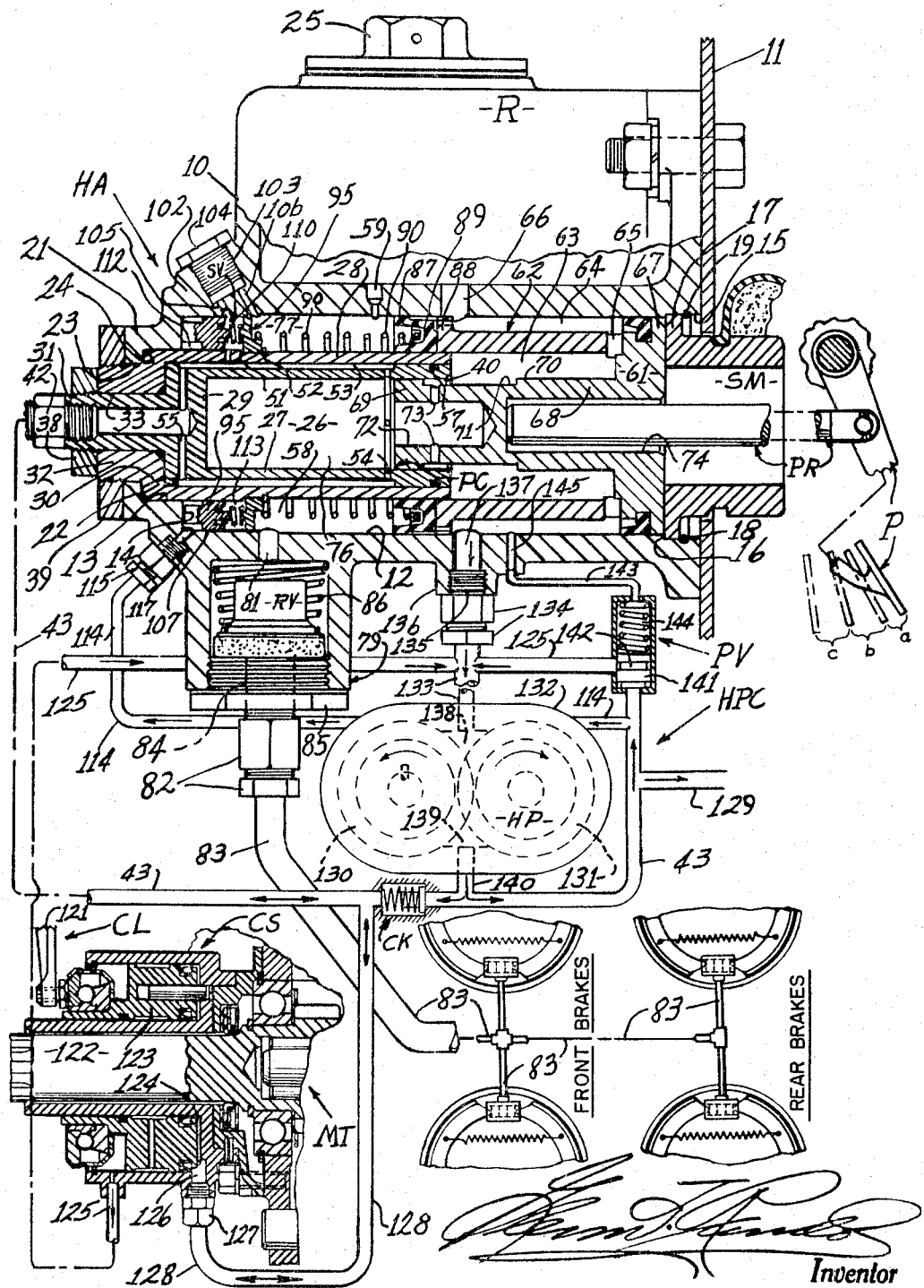
FIGURE 1 is a vertical-longitudinal section of my novel dual-cylinder hydraulic actuator embodying the principles of the present invention and shown diagrammatically connected to operate the main clutch and service brakes, respectively, of an automotive vehicle.

FIGURE 5 is a side view of the annular detachable stop member defining the closed position of the shut-off valve; and FIGURE 6 is a modified form of the inner fluid control and displacement piston in which is embodied a spring-biased two-way check-valve for regulating pump pressure in the piston chamber when the piston is retracted and for maintaining the piston chamber filled during retractile movement of said piston.

Like characters of reference designate like parts in the several views.

Referring now to the drawing, and particularly to the embodiment of my invention shown in FIGURES 1, 2, 4 and 5, the dual-cylinder hydraulic actuator generally designated HA comprises a body 10 which is bolted or otherwise attached to the engine side of the vehicle firewall 11 fragmentarily shown on the drawing. The body 10 has a longitudinally extending bore 12 therein, said bore being reduced at its forward end portion 13 to provide an internal annular shoulder at 14, and the outer end thereof terminates in a counterbore 15 to provide another internal annular shoulder at 16. A hub-like stop member SM having its forward end formed with an outstanding annular flange 17, is received by said counterbore into engagement with the shoulder 16 as shown. The opposite outer side of said flange is engaged by a split retaining ring 18 carried in an internal annular groove 19 formed in said counterbore in spaced relation to said shoulder 16 to stabilize said stop member in said counterbore and therefore coaxially with respect to said bore 12. The forward end of said bore 12 is closed by a centrally apertured wall 21 formed with a circular recess 22 which merges with said reduced bore portion 13, and communicates with a central opening 23 communicating with the exterior of said end wall as shown. Juncture of the recess 22 and reduced bore portion 13 defines an internal annular shoulder 24.

A fluid supply reservoir R having a filler cap 25 is formed as an integral part of said body and is disposed atop said bore 12 to provide gravitational feed into said bore.

Coaxially disposed substantially the forward half of said bore 12 is an inner cylinder 26, the wall of which comprises a pair of interfitting tubular members (sleeves) 27, 28 which for convenience in describing this structure will be referred to as "inner" and "outer" sleeves respectively. The forward ends of these two sleeves are closed by integral walls 29, 30, respectively, and from which extend coaxial reduced diameter cylindrical extensions 31, 32, respectively, the extension 32 projecting through opening 23, and the extension 31 projecting through a central opening 33 in the end wall 30 and extension 32 of the outer sleeve as shown. The terminating exposed portions 34, 35 of said extensions are externally threaded at 36, 37, respectively, and lock nuts 38, 39, respectively, serve to coaxially stabilize said sleeves with respect to one another and to the end wall 21. The rear open end of sleeve 27 is annularly chamfered at 40 to produce a "fluid-controlling valvular portion" for reference hereinafter.

The wall 29 and extension 31 are axially bored to provide a fluid discharge passage 41 open at its outer end and closed at its inner end by a portion of the end wall 29, said passage being processed at its outer end with threads for reception of a commercial hydraulic fitting shown in part at 42 and connected to hydraulic line 43.

As shown on the drawing, the juncture of the extension 32 with end wall 30 produces an internal annular shoulder 44, said shoulder being preferably angular at its periphery. In the assembled status of the inner cylinder and body 10 as shown in FIGURE 1, the shoulder 44 abuts the inner face of the end wall 30, and an annular channel 45 of triangular cross section is provided between the said shoulder and inner face portions of the end wall 21 and recess 22 for reception of a complemental O-ring 46 of commercial design to effect a fluid-tight seal between the outer sleeve and end wall 21 of the body 10. Similarly, the juncture between the opening 33 and inner face of said end wall 30 produces an internal annular shoulder 47 processed with an angular face portion at the said juncture of the opening 33 and wall, and another annular channel 48 of triangular cross section which receives a complemental O-ring 49 of commercial design, provides an effective fluid-tight seal between the end wall of said inner and outer sleeves 27, 28.

The exterior surface of the outer sleeve 28 is defined by an external annular shoulder 51, and an annular groove 52 spaced from said shoulder. The exterior surface of the inner sleeve 27 is defined by a longitudinally extending annular fluid space which produces with the inner confronting surface on the outer sleeve, an annular fluid transfer chamber 53, and which communicates at its rear end with the inner cylinder 26 by means of a plurality of circularly aligned control passages (ports) 54 radially projecting through the wall of an interconnecting annular channel indented in the inner surface of the wall of said inner sleeve 27, said fluid chamber being spaced forwardly of the sealed rear ends of the inner and outer sleeves 27, 28, respectively, the opposite forward end of said fluid chamber having continuous communication with said discharge passage 41 by means of a plurality of interconnecting radially disposed passages 55 incorporated in the end wall 29. Longitudinally spaced from the rear end of said fluid chamber 53 is an external annular groove 56 in the inner sleeve which receives a complemental packing 57 to effect a fluid-tight seal between the rear interfitting end portions of said sleeves 27, 28.

The outer sleeve 28 is circularly spaced from the confronting surface defining the bore 12 to produce therewith an outer annular cylinder 58. The outer cylinder is provided with a compensating port 59 which is normally open as shown in FIGURE 1.

Slidably interfitting the inner and outer cylinders 26, 58 are complementary fluid-displacement units (pistons) 61, 62, respectively, the inner piston 61 being adapted to serve as a fluid-displacement and hydraulic-power control means as will appear, while the function of the outer piston 62 is to effect fluid displacement only to actuate the vehicle service brakes, or to cooperate under certain conditions with the inner piston 61 to actuate both the service brakes and disengages the vehicle clutch as a function of personal-actuation. The coaxial overlapping relationship of the reduced rearward extending portions of these pistons produces a pair of normally circularly aligned concentric inner and outer annular fluid spaces (chambers) 63, 64, respectively, and which is connected by end slots 65 indented in the rear end face of the outer piston as shown, and which continuously communicates with the reservoir R via intake port 66. The inner piston unit 61 comprises: a relatively large diameter fluid-retaining piston 67 slidably interfitting the rear portion of said bore 12 as shown; a cylindrical extension 68 of smaller diameter coaxially projects forwardly from said last-mentioned piston unit into the inner cylinder 26, the external surface of said extension being processed with a forward valve working land 69 and a longer rear valve working land 70 in longitudinally spaced relation to produce an elongated annular fluid chamber 71 normally communicating with the fluid space 63 aforesaid, said working land 70 being adapted to cooperate with the aforesaid chamfered end 40 of said sleeve 27 to produce a pair of "fluid-controlling valvular portions"; a blind axial bore 72 is formed in the forward end portion of said extension with its open end communicating with the interior of the inner cylinder 26; a plurality of fluid-compensating and circulating control ports 73 through the wall of the latter chamber 71 interconnects the axial bore therewith. The leading left edge of the working land 69 is normally spaced to the right of the aforesaid channel-connected passages 54 for cooperating therewith to produce another pair of "fluid-controlling valvular portions," when the inner piston unit 61 is fully retracted to normal position as shown in FIGURE 1, corresponding to the vehicle clutch being fully engaged and full release of the vehicle service brakes. Initial personal-actuation of the inner piston unit 61 therefore the working land 69, positions its leading edge portion in overlying (blocking) relationship with respect to the passages 54 and thereby enabling hydraulic-power disengagement of the vehicle clutch independently of fluid-displacement from the outer cylinder 58. It is thus seen that the forward end portion of the extension 68 serves a twofold function of valvular control for passages 54, and fluid-displacement from the inner cylinder 26 jointly with the outer cylinder 58 to disengage the vehicle clutch and apply the service brakes when hydraulic-power is not available. The normal sequence of operations of the hydraulic actuator HA being to initially control disengagement of the vehicle clutch by hydraulic-power with automatic re-engagement of the clutch effective for utilizing engine braking-power upon substantial intensification of service brake application under personal-actuation of the outer piston unit 62. An elongated axial socket 74 is provided through said fluid-retaining piston 67 and a portion of the connected extension 68 for reception of the free end of a push-rod "PR" pivotally connected at its opposite (outer) end to the conventional pivotally suspended brake-pedal designated "P" for reciprocating both of said piston units simultaneously. From the foregoing description of the operational relationship between the passages (ports) and chamfered open end 40 of the inner cylinder 26 and working lands 69, 70, respectively, on the extension 68, it is seen that these elements cooperate to produce a combined fluid control and displacement unit hereinafter referred to as a "hydraulic-power control" generally designated "PC."

The fluid-retaining piston 67 is adapted to engage the rear end of the outer piston unit 62 to move in unison therewith in a fluid-pressurizing direction of control, therefore such engagement between the said piston units 61, 62 may be termed a "one-way mechanical connection (drive)" designated "MC."

The piston units 61, 62 provide with the confronting portions of said end walls 29, 23 for the inner and outer cylinders 26, 58, respectively, complemental variable pressure-working chambers 76, 77, respectively, to vary the rate of fluid displacement and pressure exerted on the fluid discharged from said cylinders. Chamber 76 communicates with said discharge passage 41 via said ports 54, 55.

A cylindrically chambered boss 79 is formed integral with the exterior of said body 10 and preferably projects horizontally therefrom in communication with the outer working chamber 77 by means of port 81 through the wall of said bore 12 as shown in FIGURE 1. A commercial hydraulic fitting 82 is adapted to connect the interior of said boss to the service brake-actuating cylinders by means of hydraulic line 83. A commercial residual pressure check-valve "RV" is operably associated with the discharge passage 84 which passes through a closure cap 85 of the chambered boss, to control the minimal pressure in the brake lines external to said outer working chamber, said residual check-valve being controllable by a normally compressed spring 86 operably incorporated in the outer working chamber to react between an outwardly flanged portion of said residual check-valve and the outer piston unit 62, to bias the latter toward normally retracted position along with the inner piston unit 61 since both of the piston units are connected by means of said one-way mechanical connection MC. Thus, when the pedal P acts on the inner piston unit, both piston units are moved in unison in a fluid-pressurizing direction, and when the spring 86 reacts on the outer piston unit both piston units are moved as a unit toward their respective normal positions as shown in FIGURE 1.

A collapsible leakproof annular seal 87 is seated on the head 88 of the outer piston unit, and is adapted to control the compensating port 59, said seal being stabilized for movement with said head by means of a complemental seal-retaining insert 89 against which the rear end of a normally compressed spring 90 reacts continuously. The seal 87 is provided with a bonded washer-like valve element 91 in the outer peripheral portion of the vertical wall 92 as shown. This washer-like element overlies the forward ends of a plurality of longitudinal passages 93 through the peripheral portion of the piston head 88 to control fluid flow from the reservoir R into the outer working chamber 77 when the outer piston unit 62 is being released toward normal position to take the vehicle service brakes "off." During such brake releasing operation, particularly if executed rapidly, a partial vacuum is created in said outer working chamber tending to cavitate the same which is prevented by fluid being drawn from the reservoir R via the intake port 66 through a series of flutes 94 formed in the outer peripheral surface of the seal aforesaid into the outer working chamber 77. Presence of such vacuum condition in said outer working chamber enables the washer-like element to withdraw from the forward confronting ends of the longitudinal passages to enable fluid flow from the outer fluid space 64 aforesaid which communicates with said intake port 66, through said flutes into said outer working chamber 77 and thereby maintaining it filled until the outer piston unit 62 is fully retracted to normal position of FIGURE 1 wherein the compensating port 59 is uncovered for fluid adjustment flow between said outer working chamber and the reservoir R in readiness for another pressurizing operation to apply the vehicle service brakes as is understood.

Circularly aligned with the aforesaid shoulder 51 on the outer sleeve 28, is an internal annular shoulder 95 formed by diminishing the forward end portion of the bore 12. An annular fixed wall 96 is adapted to abut said shoulders 51, 95 in fluid-tight sealed relation, and a split retaining ring 97 engages the aforesaid annular groove 52 to stabilize said annular fixed wall against said shoulders as shown. The outer peripheral portion of the annular fixed wall confronting the outer piston head seal 87 is offset forwardly at 98 to provide a circular ledge which acts as a support for the forward end of the aforesaid spring 90 to maintain it in working alignment with said outer piston unit 62, said fixed wall 96 serving to divide the outer cyilnder 58 into the aforesaid outer working chamber 77 and an annular valve chamber 99 with the forward end of the latter chamber being defined by that portion of the aforesaid internal annular shoulder 14 confronting said wall 96. The forward face of said wall 96 is characterized by a plurality of circumferentially spaced circular embossments 101.

An angular boss 102 is formed integrally with the upper portion of the exterior of the forward end portion of the cylindrical wall encircling the bore 12 merging with the forward vertical wall of the reservoir R. A threaded blind axial bore 103 is angularly processed in this boss with its open end closed by a threaded closure cap 104 and the inner blind end communicating with a pair of parallelly spaced fluid transfer passages 105, 106 angularly incorporated in said cylindrical wall, said passages being normally effective to interconnect the aforesaid working and valve chambers 77, 99, respectively.

Slidably disposed in said valve chamber 99 is a complemental valve-forming element 107 comprising a plurality of circular embossments 108 defining its rear face confronting said embossments 101 complemental thereto to limit movement of the valve element 107 to block communication between passages 105, 106, and encircling each of said embossments 108 is a circular recess 109, the bottom of which serving as a seat for one end of a corresponding number of normally compressed springs 110, the other end of which reacts on the confronting face portion encircling each of the embossments 101 with each pair of aligned cooperating embossments serving to maintain each spring in correct working alignment. The opposite forward face of the valve element 107 is characterized by a plurality of circular stop elements 111 which engages the forward end of the valve chamber 99 when the valve element 107 is moved to normal position under influence of said springs 110 wherein said passages 105, 106 interconnect the said valve chamber 99 with the outer working chamber 77 for an important purpose to appear.

The valve element 107 serves to divide the valve chamber 99 into two annular fluid pressure valve chambers 112, 113. Chamber 112 communicates with the exterior of the hydraulic actuator HA by means of a branch conduit 114 connected by a commercial hydraulic fitting 115 threaded into a complementally threaded bore 116 communicating with a fluid passage 117 leading to chamber 112, said bore being processed through another angular boss 118 integral with the exterior of the forward end portion of the cylindrical wall defining the bore 12 as shown. A port 119 through the wall of the tubular outer sleeve 28 is adapted to interconnect the chamber 113 with the fluid chamber 53 between the aforesaid inner and outer sleeves 27, 28, when the valve element 107 is in its normal forward position shown in FIGURE 1 under influence of springs 110. Therefore, the passage and port 105, 119, respectively, cooperate with the valve-forming element 107 to produce a shut-off valve generally designated "SV." The aforesaid normal position of the valve element 107 connects said passages 105, 106 therefore the working and valve chambers 77, 113, respectively, whereby personal-actuation of the pedal P moves the outer piston unit 62 to the left to initially cover the compensating port 59 to enable fluid in the outer working chamber 77 to be displaced via said passages 105, 106 into chamber 113, thence through port 119, fluid chamber 53, radial passages 55, discharge passage 41 into the hydraulic line 43 aforesaid, and at the same time fluid is being displaced by the outer piston unit 62 through port 81 via the residual pressure checkvalve RV into the hydraulic line 83 aforesaid, such fluid displacement being effective due to the working land 69 overlapping ports 54 aforesaid, and thereby preventing escape of pressurized fluid via said latter ports and communicating blind bore 72, and ports 73 communicating with the annular fluid chamber 71 and inner fluid space 63 back into the reservoir R via the common intake port 66. Therefore, initial personal-actuation of the two piston units 61, 62 is capable of applying the vehicle service brakes to the extent that the resistance of the spring-loaded vehicle clutch opposes disengagement of the clutch as will be more fully explained hereinafter. This initial operation while the shut-off valve SV in normal open position as shown in FIGURE 1, is preliminary to application of the vehicle service brakes and disengagement of the vehicle clutch upon personal-actuation of the pedal P through its final range of movement with the engine stopped. At this point, reference is now made to the different ranges of pedal movement to selectively effect the brake and clutch operations aforesaid. Referring to FIGURE 1, the pedal P is shown in "normal" released position wherein the vehicle service brakes are released and the vehicle main clutch fully engaged by means of its engaging-springs (not shown), movement of the pedal to its first dashed line position indicated by $a$ is effective to bring about a separate pressure producing operation for hydraulic-power disengagement of the vehicle clutch whereupon further movement of the pedal between $a$ and $b$ positions closes the compensating port 59 for the outer working chamber 77 to produce another separate pressure producing operation of the fluid therein and connected brake line 83 to apply the vehicle service brakes as required. Firm engagement of the service brakes disposes the rear edge of the working land 69 as shown by the second dashed line position in FIGURE 2 to the left of said control ports 54 and thereby placing such ports in communication with the annular chamber 71, to disable hydraulic clutch disengagement for automatic spring reengagement of the clutch to ensue, but at this point the forward leading edge of the working land 70 is approaching overlapping relationship with respect to the rear internally chamfered end 40 of the inner cylinder 26 to isolate fluid chambers 63, 71 and thereby conditioning the inner working chamber 76 to displace fluid therefrom via the aforesaid axial bore 72, ports 73, annular chamber 71, control passages 54, fluid chamber 53, radial passages 55 and discharge passage 41 into the hydraulic line 43, such fluid displacement taking place jointly with that being effected by the outer piston unit 62 via passages 105, 106, chamber 113, port 119 and fluid chamber 53. Accordingly, the latter fluid displacement by both piston units 61, 62 being adapted to effect a joint pressure producing operation under influence of pedal P movement in its third or final range defined by position $c$ in FIGURE 1 when the engine is turned "off." Operator force exerted on the pedal P to move the same toward position $c$ is effective to displace sufficient fluid for clutch disengagement and at the same time maintain the service brakes applied. This brake-applying and declutching operation serves an important purpose in the operation of a motor vehicle or the like from which the conventional clutch-pedal is deleted, in that when parking the vehicle on a gradient "in-gear" for utilization of engine braking-power to stabilize the vehicle while so parked with the main vehicle clutch engaged under spring pressure, should coasting load torque become effective on the drive line, the active gear train in the change-speed transmission would be subjected to a "pinching" effect preventing neutralization thereof to enable starting the engine. Thus, under such load conditions the vehicle would be rendered inoperative because the engine could not be released for starting to produce the required hydraulic-power to disengage the clutch in normal operating manner. This is a special feature of the present invention which enables normal hydraulic disengagement of a spring-engageable clutch by an effortless touch of the brake-pedal P by moving the same from normal position to substantially position $a$, with release of the pedal from its position in range $a$ to normal position accommodating spring-engagement of the clutch automatically, but should the engine stall while the transmission is "in-gear" enabling "roll" of the vehicle to impress coasting torque on the drive line and transmission, the operator merely depresses the pedal P to the required position in final range of pedal movement from $b$ to $c$ to apply the service brakes and disengage the clutch so that the engine can be started and thus restoring normal hydraulic-power operation of the clutch under control of pedal movement in first range defined by positions "normal" and $a$. It is important to note that brake application is effective to hold the vehicle against further "roll" while the clutch is disengaged under such circumstances until the engine can be started for normal power-disengagement of the clutch and selective personal-actuation of the service brakes.

Referring again to the aforesaid positions $a$, $b$ and $c$ of the pedal P which correspond substantially to the solid line position and the second and third dashed line positions of the fluid-displacement members (pistons) 61, 62, respectively, shown in FIGURE 2. These positions constitute "first," "second," and "third" ranges of pedal movements from normal position shown in FIGURE 1 to $a$ position (first range) to induce hydraulic disengagement of the clutch CL followed by a first portion movement within second range $a$ to $b$ positions to condition the outer piston 62 to operate the service brakes and upon effective engagement of the latter while the pedal P is still within its "second" range of movement and the latter portion of the latter movement being effective to firmly apply said brakes and disable hydraulic disengagement of the clutch thus enabling automatic spring-reengagement of the latter to provide supplemental engine-compression braking as indicated by the second dashed line position of the pistons 61, 62 in FIGURE 2 without interrupting the aforesaid service brake applying operation. Upon movement of the pedal P toward its $c$ position (third range) while the engine is turned "off," the inner piston 61 is isolated from the supply reservoir R and placed in fluid communication with the outer piston 62 via control passages 54, annular fluid chamber 71, ports 73, axial bore 72, fluid transfer chamber 53, port 119, valve chamber 113, and transfer passages 105, 106 when the shutoff valve element 107 is in its FIGURE 1 position, whereby said pistons team together to displace sufficient fluid simultaneously under pressure to maintain (operate) the service brakes "on" and at the same time operate the clutch servo CS to disengage the clutch CL to disconnect the engine for starting in the event the vehicle is parked "in-gear" and subsequent "coasting roll" thereof locks the "in-gear" drive against manual neutralization. Moreover, each of the pistons 61, 62 is characterized by controlling separate pressure producing operations for hydraulic clutch disengagement and service brake operation while when teamed together in the third range of movement, a joint pressure producing operation is effected to disengage the clutch CL and operate the service brakes simultaneously when the engine is turned "off."

Illustrated in FIGURE 1 is the conventional spring-engageable master friction clutch indicated fragmentarily at "CL" by one of its releasing (operating) levers 121 and output shaft 122, such a clutch being conventionally interposed in the vehicle drive line between the engine flywheel (not shown) and the associated manual-shift transmission fragmentarily indicated by a portion of its housing and gearing at "MT." Rotation of the releasing levers 121 in a clockwise direction as viewed in FIGURE 1, is effective to separate the clutch driving and driven members (not shown) to disengage them thus effecting a declutching operation as in understood. A hydraulic clutch-servo (actuator) shown at "CS" includes an annular-type servo-piston 123 and a pressure-applying annular working chamber 124 therefor including a drain line 125 for returning seepage past the servo-piston to the reservoir R. A pressure input passage 126 leading to said working chamber passes through the wall of said clutch-servo, and is connected by means of a commercial hydraulic fitting 127 to a pressure output line 128. A branch pressure output line 129 is adapted to divert pressure flow from the hydraulic line 43 to the engine oil gallery (not shown) to pressure lubricate the working parts of the engine, such installation contemplating use of a fluid suitable for both lubricating and clutch-actuating purposes, and wherein the supply reservoir R would have communication with the engine sump oil to maintain the former filled. Also, the pressure output line 129 is readily adaptable to serve the control valve for hydraulic-power steering operation, and wherein the supply reservoir would supply the pump HP for both steering and declutching purposes so that the conventional fluid reservoir for power-steering operations could be eliminated.

The volume of fluid required for actuation of the servo-piston 123, necessitates use of the combined fluid displacement by both piston units 61, 62 when personal-actuation of clutch disengagement is effected while the engine is stopped and the gear train in the transmission MT under torque imposed by "coasting-roll" of the vehicle.

*Hydraulic-power mechanism and control circuit therefor*

Reference is again made to FIGURE 1 wherein there is a schematized illustration of a hydraulic-power circuit generally designated "HPC" of substantially conventional character and in which there is interposed a gear-type hydraulic pump "HP" which is typical of such pumps capable of producing variable pressure output in accordance with the speed of a rotating element of the engine for pressure lubricating the working parts thereof, or similar pumps mounted on the exterior of the engine or driven independently by an electric motor, for operating commercial hydraulic-power steering systems, or driven from the tailshaft of commercial automatic hydraulic transmissions. The aforesaid pump HP and included shutoff valve SV produce what may be termed a "speed-sensitive" (responsive) device in which its valve element 107 is operable from the aforesaid normal position of fluid-control wherein the aforesaid "separate pressure" operation under influence of the pump P is effective to disengage the clutch CL automatically upon operating the pedal P from normal position to substantially $a$ position, and to a different fluid-controlling position wherein the aforesaid "joint pressure operation" is effective upon operating said pedal P within its third $c$ range of movements to effect manual application of the service brakes and disengagement of the clutch CL when the engine is turned "off." The conventional pump design comprises, by way of example, a pair of intermeshing drive and driven gears 130, 131, respectively, which are rotatably mounted within a sealed housing 132 having the major portion of the interior of its wall in close adjacency to the periphery of the gear teeth, a suction line 133 having its upper end portion in continuous fluid communication with the outer fluid space 64 by means of a commercial axially bored hydraulic fitting 134 having an externally threaded stem 135 connected to an internally threaded depending boss 136 integral with the exterior of the cylindrical wall defining the bore 12, said boss being provided with a passage 137 which interconnects the annular fluid space 64 with the axial bore in said fitting. The lower end of said suction line being connected to the pump intake port 138 with the pressure discharge port 139 being connected to a pressure output line 140 which in turn intersects the aforesaid hydraulic line 43 which continuously communicates with the conventional spring-loaded pressure-regulating valve "PV" having a piston-like element 141 movable under influence of said spring load and provided with an external annular fluid channel 142 which normally communicates with the aforesaid drain (suction) line 125 adapted to intersect the aforesaid suction line 133. Another drain line 143 interconnects the spring chamber 144 of the pressure regulating valve PV with the outer fluid space 64 in the hydraulic actuator HA by means of a passage 145 passing through the cylindrical wall defining the bore 12. A one-way check-valve CK is interposed in said hydraulic line 43, and which is provided with a spring-loaded element movable in a chamber to seat on one end thereof for closing the connected end of the right portion of said conduit 43 as shown, and thereby blocking fluid return against pressure output by said pump HP, and intersectiong that portion of said line 43 in which two-directional fluid flow is accommodated ahead of said check-valve CK, is the aforesaid pressure input line 128, and the aforesaid conduit 114 intersects the hydraulic line 43 ahead of the aforesaid pressure regulating valve PV to enable pressurized fluid produced by said pump HP to communicate with the valve chamber 112 to activate the shut-off valve SV to closed position as shown in FIGURE 2 as a function of engine operation of the pump HP therefore speed of the engine. Accordingly, when the shut-off valve SV is closed, the inner and outer cylinders 26, 58 respectively of the hydraulic actuator HA are isolated from communicating with each other therefore functioning independently whereby clutch disengagement is hydraulically-controlled, and service brake operation personally-controlled in that order in response to personal-actuation of the pedal from "normal" position into first and second ranges of control defined by characters *a* and *b*, respectively.

In operation, the pump HP is capacitated to displace sufficient fluid to lubricate the working parts of the engine and/or actuate the hydraulic-power steering mechanism and effect the aforesaid declutching operation in opposition to the engaging-springs (not shown). Thus, a single pump driven from a rotating part of the engine proportionately thereto provides the source of pressure fluid for both operations including the power-steering operation when the vehicle is so equipped, for economy and simplification of installation, particularly when the present actuator HA is sold as an after-market replacement for the conventional firewall mounted master brake cylinder. Operation of the pump HP even at engine idling speed is so designed that adequate fluid displacement is produced to disengage the clutch CL so that the car can be brought to a temporary stop as at a traffic light with the engine running and at the same time properly lubricate the engine working parts or actuate the power-steering mechanism. Since the aforesaid shut-off valve SV is responsive to the pressure produced by the pump HP, it follows that this valve functions as a "speed-responsive valve" in response to such pressure developed by said pump HP as a function of speed of the engine to operate said valve to closed position as shown in FIGURE 2.

The function of the check-valve CK is to prevent back-pressure in the pressure output line 140 with consequent seepage past the intermeshing pump gears when the engine is stopped, so that in the event the clutch-disengaging operation is required as in case of parking the vehicle "in-gear" on a gradient, as above explained to release the engine for starting from personal-actuation of both piston units 61, 62, the fluid displaced by both cylinders 26, 58 cannot enter that portion of the hydraulic line 43 leading from the right side of said check-valve CK toward the pressure output line 140. With this arrangement, all of the fluid displaced by both piston units 61, 62, is directed against the clutch disengaging servo-piston 123 and the wheel cylinders for actuating the service brakes.

*Modified inner piston unit construction and operation*

Referring to FIGURE 6 there is disclosed a modified form of the inner piston unit wherein the axial bore 72 of the main embodiment is replaced by a relatively smaller diameter axial bore 150 having a blind end and an open end communicating with an elongated counterbore 151 which merges with another terminating counterbore 152 in the end portion of the extension 68 which normally projects into the inner cylinder 26. Juncture of the axial bore 150 and counterbore 151 produces an annular wall 153, and juncture of the two counterbores aforesaid produces a substantially horizontal V-shaped groove 154. A flexible washer-like valve element 155 is disposed with its peripheral face portion 156 complementally embossed to mate with said V-shaped groove and thereby serving to anchor said resilient valve between said counterbores, said valve element 155 having a central aperture circularly spaced from the counterbore 151 therefore capable of longitudinal flexing for an important function to appear.

Juxtaposed on the forward side of the flexible valve element, is an overlying circular valve plate 157 and which is positioned in the counterbore 152 contiguously to said flexible element, and a split retaining ring 158 is adapted to engage an internal annular groove 159 formed in the counterbore 152 adjacent the forward face of the said valve plate to stabilize the latter under compressive deformation of the flexible element and therefore the peripheral portion of the latter which defines said complemental embossment thereon, and accommodate flexing of the peripheral marginal portion defining said central aperture. This valve plate is processed with a plurality of passages 161 which the inner circular portion of the flexible valve element overlies, and another plurality of passages 162 of less radial distance from the axis of said plate, is provided to interconnect the interior of the inner cylinder 26 with said counterbore 151. A poppet-type valve "PT" is provided with a valve head 163 and a valve stem 164 integral therewith as shown, said stem being adapted to project through a central hole 165 in the valve plate and to span the counterbore 151 for the free end portion of the stem to have sliding support in the aforesaid axial bore 150 as shown, thus serving to maintain the poppet valve PT in coaxial relationship with the axis of the inner piston unit 61. The valve head 163 is adapted to overlie the passages 162 and block the same by seating against the valve plate. Spaced from the right end of the valve stem 164 is an annular external groove 166 which is engaged by a split retaining ring 167 to back an annular spring seat 168 through which said valve stem projects as shown. Positioned between the confronting face on the valve plate 157 and said spring seat is a normally compressed spring 169 adapted to bias the valve head 163 into releasably seated engagement with said valve plate to block said passages 162 to prevent fluid flow therethrough. Another normally preloaded compression spring 171 is positioned in the counterbore 151 to react between the wall 153 and a pressure-applying element 172 of annular configuration in L-shaped in cross section. The vertical leg of this pressure element bears against the confronting side of the flexible valve element 155, and the horizontal leg serves as a support for the left end of the spring 171 to maintain the latter in correct working alignment with respect to the said flexible valve element which is biased by this latter spring to releasably close the passages 161.

The poppet head 163 cooperates with the passages 162 to produce a one-way check-valve for controlling inflow of fluid from the reservoir R via the aforesaid elongated fluid chamber 71 during retraction of the inner piston unit 61 into the inner cylinder 26, and the flexible valve element 155 cooperates with the passages 161 to produce another one-way check-valve for controlling outflow from the inner cylinder 26 into the counterbore 151, ports 73 and fluid chamber 71, thence back to the reservoir R, during protraction of the inner piston unit 61.

Therefore, the two one-way check-valves may be termed a two-directional flow check-valve. The purpose of this two-way check-valve is to control the fluid volume in the inner cylinder 26 and connected hydraulic lines served thereby so that irrespective of the mode of operation, that is rapid or slow, of the inner piston unit 61, the inner cooperating cylinder 26 will never tend to cavitate but to the contrary always be filled so that when power control is effective to disengage the clutch CL, the driver may move the pedal P with rapidity for quick clutch disengagement to facilitate speed changes so that vehicular speed will respond quickly to accelerator opening, otherwise, if the inner cylinder were cavitated, delayed clutch response would occur due to time-lag necessary for the pump HP to fill said inner cylinder and communicating hydraulic lines before fluid could be pressurized therein to activate clutch disengagement.

*Operational summary*

In operation, the aforedescribed hydraulic control system HPC for the controlling of hydraulic disengagement of the vehicle clutch CL and sequentially operating the vehicle service brakes or simultaneously therewith, is shown in FIGURE 1 with the clutch CL fully engaged under spring-bias, the brake-pedal P in normal released position corresponding to brakes "off" with the vehicle engine stopped. Under these circumstances, if the vehicle is parked "in-gear" on a gradient, with the roll of the vehicle impressing torque on the drive line and connected active gear train induced by opposition of the engine compression braking-power, neutralization of the manual-shift transmission MT cannot be accomplished due to bind in the gear train, thus rendering the vehicle inoperative until the active gear train can be disengaged to free the engine for starting. Such freeing of the engine is effected by the driver pressing through on the brake-pedal P to move the dual-piston assembly 61, 62 as a unit to the position of FIGURE 3 wherein the pedal is operating in its third range of movement defined by positions *b* and *c*, to effect joint fluid displacement from the corresponding working chambers 76, 77, with fluid displaced from chamber 76 being conveyed under pressure of the inner piston unit 61 via axial bore 72, ports 73, annular chamber 71, (note that this chamber is isolated from the inner annular fluid space 63 by the working land 70 overlapping the rear end portion 40 of the inner chamfered sleeve 27 defining the inner cylinder 26), annular chamber 53, radial passages 55, discharge passage 41 into the hydraulic line 43, thence into line 128 into the working chamber 124 of the clutch-servo CS to activate the servo-piston leftward to rotate the clutch levers 121 clockwise and thereby separating the clutch friction members (not shown) in opposition to the clutch-engaging springs (not shown). At the same time, the inner piston unit 61 is effecting the aforesaid fluid displacement into the hydraulic line 43, the outer piston unit 62 is jointly displacing fluid from its working chamber 77, via the passages 106, 105, annular chamber 113, port 119 into annular chamber 53, thence into the radial passages 55 and discharge passage 41 to supplement the fluid being displaced by the inner piston unit under the abovedescribed conditions, to provide adequate fluid displacement for actuation of the clutch-servo piston 123 to disengage the clutch CL in the well known manner. Also, the outer piston unit 62 is effective to divert a portion of the fluid in its working chamber 77 through port 81 into the chambered boss 79, thence through the one-way discharge valve (not shown) incorporated in the residual pressure valve RV through the discharge passage 84, connected hydraulic fitting 82 and connected line 83 to actuate the wheel cylinders for service brake operation as shown, to apply the brakes, such application of the brakes occurring prior to both piston units 61, 62 actuating the clutch servo-piston 123 to disengage the clutch CL. Therefore, the driver is able to hold the service brakes applied to stabilize the vehicle on the aforesaid gradient if present, and disengage the clutch CL to free the engine for starting, which when started drives the hydraulic pump HP in the direction of the arrows to pressurize the fluid drawn through suction line 133 from the outer annular fluid space 64 therefore from the reservoir R, and displacing the same into the connected pressure output line 140 which distributes such pressurized fluid in two directions into the hydraulic line 43 to pass through the check-valve CK into the left portion of the line 43 communicating with the inner cylinder 26 and the clutch-servo CS, and in the opposite direction against the spring-loaded element 141 in the pressure regulating valve PV, and into said branch conduit 114 intersecting the line 43, into the chamber 112 of the shut-off valve SV to force the valve-forming element 107 from its normal open position of FIGURE 1 to its operated closed position of FIGURE 2 wherein the latter element blocks communication between the passage 105 and port 119 and, therefore isolating the outer working chamber 77 from the inner working chamber 76 so that the outer piston unit 62 can displace fluid for service brake actuation only, while the inner piston unit 61 is effective to control hydraulic-power actuation of the clutch CL to disengage the same and accommodate its re-engagement under influence of spring pressure, such power-disengagement of the clutch being under control and induced by the working land 69 blocking the control passages 54 in response to initial movement of the brake-pedal P from "normal" position into first range defined by position *a* causing pressure build-up in the hydraulic line 43 therefore against the servo-piston 123 to disengage the clutch CL. Under these circumstances, fluid contained in the inner working chamber 76 is displaced through the axial bore 72, ports 73 and annular chamber 71 into the inner annular fluid space 63, thence through the end slots 65 into the outer annular fluid space 64 via the intake port 66 back into the reservoir R for recirculation by the pump HP. It is important to note that the fluid in the inner working chamber 76 is at atmospheric pressure therefore static like the fluid in the reservoir R, when the hydraulic power control PC is effective to induce clutch disengagement by pressure produced by the pump HP driven from a rotating element of the engine at speeds proportional thereto. Inditial depression of the pedal P from "normal" position to or within the first range defined by *a* activates power-disengagement of the clutch CL, and upon depressing the pedal in said second range defined by positions *a* and *b*, the outer piston unit 62 upon closing its compensating port 59, effects service brake application as required, but upon such braking application becoming sufficiently intensified, to dispose the dual-piston assembly 61, 62 as depicted by the second dashed line position of FIGURE 2, clutch re-engagement automatically occurs under spring-bias due to the right edge of the working land 69 uncovering the control passages 54 which connects the hydraulic line 43 via said open passages to the inner annular fluid space 63 thus releasing the pressurized fluid from the pump HP to return to the reservoir R therefore such fluid idly circulates through the annular fluid chamber 53 via passages 54 back into the reservoir R and thence back through the suction line 133 through the pump HP and connected discharge line 140 into hydraulic line 43 to again return to the chamber 53 via the discharge passage 41 and radial interconnecting passages 55. The purpose of such clutch re-engagement is to take advantage of the engine braking-power to supplement service brake operation, especially during a panic or firm brake application.

Upon removing foot pressure from the brake pedal P, the dual-piston assembly 61, 62 returns to "normal" position under influence of spring 90 and reaction from the wheel cylinder return springs to normalize the inner piston unit 61 via the one-way mechanical connection MC between it and the outer piston unit 62 to establish "normal" position for both piston units, but initial movement of the piston units from the position indicated by the second dashed lines in FIGURE 2, momentarily induces clutch disengagement as the working land 69 blocks the control ports 54 in moving toward released position, such momentary disengagement of the clutch is not objectionable since the vehicle is underway and the service brakes are released with only slight engine speed modulation being noticeable to the driver during such momentary transition from clutch engagement to disengagement followed immediately by automatic lock-up of the clutch CL for normal vehicular drive.

From the foregoing operational description, it should be appreciated that the present novel hydraulic actuator HA provides for effortless clutch disengagement by merely touching the control pedal P followed by service brake operation in a different zone of pedal movement, and that such braking operation when sufficiently intensified induces the clutch CL to re-engage automatically to provide engine braking-power to supplement service brake application which braking efficiency is especially desirable as an added safety measure on mountain roads, high speed driving, or even stop-and-go city driving.

Another important advantage provided by the present invention resides in the novel utilization of the hydraulic actuator HA under personal-actuation to disengage the clutch CL when the engine stalls or the car is parked while the manual-shift transmission is "in-gear" on a gradient with the service brakes inadvertently released before starting the engine, or the parking brake not applied or released before applying the service brakes, enabling roll of the car to apply "coasting load" on the drive line and thus binding the active gear train against neutralization under manual-actuation. Under these circumstances, the car would be rendered inoperative requiring the expense and inconvenience of using another vehicle for push-starting the engine to drive the pump HP to produce pressurized fluid to actuate the clutch servo-piston 123 to disengage the clutch CL under control of the initial pedal moveemnt. Thus, when the pedal P is depressed into its zone of movement defined by the pedal travel between positions "b" and "c" which is effective to lap the working land and cooperating chamfered portion 40 defining the open end of the inner cylinder 26, and to dispose the working land 69 out of circular alignment with respect to control ports 54 and thereby placing the latter in communication with the fluid chamber 71, control ports 73 and axial bore 72 processed in the inner piston 61 (see FIGURE 3) whereby the working chambers 76, 77 are interconnected to enable joint displacement of fluid to apply the services brakes and disengage the clutch CL, the driver has full control of clutch disengagement notwithstanding the engine is stopped or whether or not the transmission MT is neutralized or in a gear operative condition.

The invention contemplates that operation of the pump HP at engine idling speed would produce sufficient fluid displacement to actuate the clutch CL and lubricate the working parts of the engine or actuate the power steering system in addition to the service brakes so that a single pump as illustrated can be utilized for lubricating, service braking or power steering and control clutch disengagement. The hydraulic actuator HA is substantially the same overall size as the conventional master brake cylinder, and is adapted for installation on the engine side of the vehicle firewall 11 by means of the same mounting bolts as shown employed in mounting the master cylinder as original equipment. Therefore, the present actuator HA is suitable for both the after-market and original equipment.

It should be further appreciated from the foregoing disclosure, of the two embodiments of the present invention, that the objects hereinbefore enumerated and otherwise disclosed in the foregoing description have been achieved with the result that I have provided a simplified and compact design of a multiple cylinder hydraulic actuator which incorporates a one-way coupling between the dual-piston assembly 61, 62 to enable unitary movement thereof to effect sequential clutch and service brake operations with only initial movement of the control pedal P being required to activate automatic disengagement of the clutch CL; reduction of pedal effort to a minimum as well as correspondingly shortening pedal travel; and yet includes in the actuator HA, means for declutching in response to personal-actuation of the pedal at will simultaneously with the effectiveness of service brake application, and for automatically diverting a portion of the brake cylinder fluid to supplement the displacement required by the clutch-actuator CS to insure adequate fluid displacement for clutch actuation without impairing brake operation.

It will be further seen that certain inter-related components of my dual-cylinder actuator HA possess similar functional characteristics such that interchangeability is readily effected, particularly in connection with the two-way flow check-valve control shown in FIGURE 6 which may readily be substituted for the axial bore 72 in the main embodiment of FIGURES 1–5 to prevent cavitation with resultant delay in clutch-disengaging operation under control of the hydraulic-power control PC.

It should be understood that I do not wish my invention to be limited to the above-described novel association of elements and details, and that the invention includes such other modifications and substitutions readily apparent to persons skilled in the art to which the invention relates, as defined by the terms of the subjoined claims.

Having thus described my invention, I claim:

1. In a dual-cylinder hydraulic actuator having a body characterized by an inner and an outer cylindrically walled cylinder in telescopic concentric overlapping relationship, a fluid supply reservoir for said cylinders, separate pressure output lines from said cylinders, respectively, connected to convey actuating fluid to operate the main vehicle clutch and service brakes of a motor vehicle and the like, a pair of piston units operably disposed in said cylinders, respectively, for working the fluid in their respective working chambers therebetween, a pair of discharge ports for said working chambers connected to their respective pressure output lines, a compensating port normally interconnecting said reservoir with the working chamber of the outer cylinder when said piston units are fully retracted into normal position, a common intake port between said reservoir and both of said piston units, a one-way mechanical connection between said piston units, and which is operative to move both piston units simultaneously in a fluid-pressurizing direction, a fixed wall closing the ends of said working chambers opposite said piston units, a pair of concentric annular static fluid chambers between circularly aligned portions of said piston units, a passageway interconnecting said last-named chambers, the latter being in continuous communication with said reservoir fluid via said common intake port, the improvement which comprises: an annular fixed wall spaced from the first-named fixed wall defining an annular valve chamber between the outer working chamber and annular fixed wall; shut-off valve means including a complemental valve-forming element reciprocable in said valve chamber and serving to divide the same into two fluid pressure chambers; spring means including a normally compressed spring operable positioned within one of said fluid pressure chambers for biasing said valve-forming element toward normal position; a pressure input line communicating with the other fluid pressure chamber; a pair of fluid passages normally interconnecting the working chamber of said outer cylinder with said one fluid pressure chamber when said valve-forming element is in normal position; a longitudinal passage provided in the cylindrical wall of the inner cylinder and which is closed at both ends; a port in the cylindrical wall of the inner cylinder interconnecting said other fluid pressure chamber with said longitudinal passage when said valve-forming element is in normal position; another port through a different portion of the cylindrical wall of said inner cylinder for interconnecting said longitudinal passage with the working chamber of said inner cylinder when both piston units are in normal position; a fluid-retaining piston slidably disposed in the outer cylinder, and which defines the rear closed ends of the pair of static fluid chambers aforesaid; a cylindrical extension projecing from said fluid-retaining piston into said inner cylinder; a pair of longitudinally spaced fore and aft annular working lands defining a portion of the outer surface of said extension with the forward land having front and rear leading edges, and which normally projects into said inner cylinder with its front leading edge spaced from said last-named port, said rear working land having a front leading edge only; an external annular chamber defined by the space between said working lands; an axial bore processed in the inner end portion of the said extension; a port through the cylindrical wall of said axial bore communicating with said last-named chamber; a hydraulic pressure-producing system including a pump communicating with said pressure input line to move said valve-forming element to a position against its spring bias to block communication between said first-named port in the cylindrical wall of the inner cylinder and said pair of interconnecting fluid passages and thereby isolating the working chambers of said outer and inner cylinders, to enable the former cylinder to operate the vehicle service brakes, and the latter cylinder to control hydraulic-disengagement of said vehicle clutch; another spring means including a normally compressed spring operatively positioned within the outer working chamber of the outer cylinder to react between said annular fixed wall and said outer piston unit to bias both piston units toward normal position; and an operator-operated member operable from normal released position through first, second and third ranges of movement whereby first range of movement is effective to initially move both piston units simultaneously in their respective outer and inner cylinders to first close the aforesaid port in a different portion of the cylindrical wall of said inner cylinder to block non-activating fluid-flow from said pump via the pressure output line aforesaid communicating with the working chamber of said inner cylinder back to said reservoir and thereby inducing pressurization of the fluid displacing by said pump; another pressure output line leading from said last-named pressure output line to the working chamber of said inner cylinder; a hydraulic clutch-servo for activating the piston thereof to disengage the vehicle clutch in response to said fluid pressurization; said second range of movement of said operator member being effective to close the aforesaid compensating port to condition the working chamber of said outer cylinder to apply the vehicle service brakes, and sequentially dispose the rear leading edge of the forward working land on said extension to place said port in a different position of the cylindrical wall of said inner cylinder in communication with the annular fluid chamber disposed between said working lands, and thereby releasing said pressurized fluid into said reservoir to accommodate automatic re-engagement of said vehicle clutch while said outer piston unit maintains the vehicle service brakes applied; and said third range of movement of said operator member being effective to project the front leading edge of said rear working land on said extension into the open end of said inner cylinder to isolate said annular fluid chamber between said working lands from said reservoir fluid whereby fluid displaced by the working chamber of said inner cylinder cooperates with that being displaced by the working chamber of said outer cylinder when the said valve-forming element is in normal position interconnecting said pair of fluid passages with the first-named port in the cylindrical wall of said inner cylinder, to apply the vehicle service brakes and actuate the hydraulic clutch-servo aforesaid to disengage said vehicle clutch in response to operator-operation of said operator member.

2. A dual-cylinder hydraulic actuator constructed in accordance with claim 1 in which said body is processed with a cavity-forming space defining said fluid reservoir for gravitational feed therefrom via said compensating and intake ports aforesaid into a longitudinal bore, the forward end of said bore terminating in a reduced portion to produce an internal annular shoulder, and a closed end wall, the rear end of said bore merging with a terminating counterbore to produce another internal annular shoulder, said counterbore being provided with an internal annular groove longitudinally spaced from said last-named shoulder; a hub-like stop member provided at its inner end with an outstanding circular flange interfits said counterbore with the flanged end thereof occupying the space between said last-named shoulder and said groove; a split retaining ring engages said groove to stabilize said stop member in coaxial relationship to said bore; and a central aperture processed through the aforesaid end of said bore to produce therewith another internal annular shoulder.

3. A dual-cylinder hydraulic actuator constructed in accordance with claim 2 in which said dual-cylinders include: a pair of interfitting cylindrical sleeves with the inner sleeve being processed with an elongated external annular space to produce said longitudinal passage between said sleeves in assembled status; an external enlarged diameter portion at the forward end portion of said outer sleeve in circular alignment with the reduced portion in said portion; an external annular shoulder defining the juncture of said enlarged diameter portion with the normal diameter portion of said outer sleeve, said last-named shoulder being in circular alignment with the first-named internal shoulder in said bore, the inner and outer peripheral portions of the annular fixed wall aforesaid being adapted to seat against said two shoulders last-mentioned in fluid-tight sealed relation therewith to produce said annular valve chamber; an external annular groove formed in the outer normal surface of the outer sleeve in longitudinally spaced relation to said external annular shoulder; a split retaining ring engaging said last-named groove in close adjacency to the inner confronting peripheral margin on said annular fixed wall to stabilize the latter in fluid-tight position aforesaid; a pair of reduced diameter interfitting extensions projecting from the closed ends of said interfitting sleeves, respectively, in coaxial relationship thereto, the outer extension projecting through the aforesaid aperture provided in the end wall of said bore to the exterior thereof, and the inner extension projecting through the outer extension to the exterior thereof to position both sleeves in assembled status in circularly spaced relation with respect to the forward portion of said bore to produce the said outer annular cylinder therewith, the interior of said inner sleeve being adapted to produce the aforesaid inner cylinder; externally threaded portions define the exterior portions of said extensions; and a pair of lock-nuts engage said threaded portions, respectively, to clamp the pair of interfitting sleeves in fluid-tight sealed relation with respect to each other and to the other internal annular shoulder aforesaid on the closed end wall of said bore aforesaid, the forward end walls of said interfitting sleeves defining with their respective extensions aforesaid an external and an internal annular shoulder, respectively, between said last-named end walls, and an external annular shoulder on the end wall of said outer sleeve in fluid-tight sealed engagement, said inner extension being axially bored to provide the aforesaid discharge passage for the working chamber of said inner cylinder.

4. A dual-cylinder hydraulic actuator constructed in accordance with claim 1 in which said hydraulic-pressure-producing system additionally includes: an intake and a discharge port on opposite sides, respectively, of said pump; a suction line interconnecting said intake port with the outer static fluid space aforesaid which is in continuous fluid communication with said reservoir fluid via said common intake port; a discharge line interconnecting said pump discharge port with the pressure output line communicating with the working chamber of the inner cylinder aforesaid; a spring-biased check-valve interposed in the last-named pressure output line between the intersection of the pressure output line leading to said clutch-servo and said discharge line; a pressure-regulating valve interposed between said pressure output line communicating with the working chamber of said inner cylinder and a return line which intersects said suction line for communication with the interior of said clutch-servo to convey seepage past the said servo-piston back to the outer annular static space in the hydraulic actuator body, thence to the aforesaid reservoir, said pressure-regulating valve including a spring-biased piston element responsive to pressure change in the pressure output line communicating with the working chamber of the inner cylinder aforesaid, to establish maximum pressure output of said pump; and another return line communicating with the interior of said pressure-regulating valve for conveying excess fluid pressure generated in said last-named output pressure line back to said outer annular static space for recirculation by said pump upon movement of said regulating valve piston element against its spring bias to interconnect said last-named output line with said other return line.

5. In a dual-cylinder hydraulic actuator adapted for use to control the main clutch and service brakes of a motor vehicle and the like, and which is characterized by a pair of concentric overlapping cylinders, a fluid supply reservoir for said cylinders, a pair of piston units operably disposed in said cylinders, respectively, for pressurizing the fluid in their respective working chambers therebetween, a discharge port for the working chamber of one of said cylinders, a discharge port for the other cylinder, and intake port common to both cylinders, a compensating port normally open between the reservoir and working chamber of said one cylinder when said piston units are in normally released position, a clutch-servo for disengaging the vehicle clutch, a plurality of wheel cylinders for actuating the service brakes, and an engine-driven hydraulic pump having an intake and a discharge port, the improvement which comprises: a hydraulic line for conveying pressurized fluid from the said pump discharge port to said clutch-servo to effect disengagement of the vehicle clutch; another hydraulic line for conveying pressurized fluid from the working chamber of the one cylinder via said first-named discharge port to said wheel cylinders to apply said service brakes upon closure of said compensating port; power control means including a port in the other cylinder and a cooperating control land on the piston unit operable in said other cylinder to interrupt fluid flow through said intake port and thereby inducing pressure build-up in the hydraulic line between said pump discharge port and said clutch-servo; a speed-responsive control valve incorporated between said working chambers of said cylinders, respectively and operable from normal position wherein said last-named chambers are in communication with each other to a different position wherein said last-named chambers are isolated from each other to condition the working chamber of said one cylinder to operate the wheel cylinders for said service brakes, in response to pressurized fluid produced by said pump as a function of engine speed; a fluid pressure conveying line interconnecting said pump discharge port and speed-responsive control valve to operate the latter from normal position to its different position; spring means including a normally compressed spring for biasing said speed-responsive control valve toward normal position; another spring means including a normally compressed spring for biasing said piston units toward normal position; a suction line interconnecting said fluid reservoir with the pump intake port; and an operator-operated member movable from normal position corresponding to normal position of said piston units, through first, second and third ranges of movement for first range operation of said power control means to blocking position to control disengagement of the vehicle clutch by said clutch-servo upon pump-pressure operation of said speed-responsive control valve to said different position to isolate the working chambers of said cylinders, respectively, for second range operation to close said compensating port and thereby conditioning the working chamber of said one cylinder to actuate the wheel cylinders for said service brakes to apply the same and accommodate re-engagement of the vehicle clutch automatically in response to a predetermined intensification of braking pressure for utilization of engine braking-power in cooperation with brake-actuation by said one cylinder under operator-operation, and for third range operation to combine the working chambers of both cylinders, respectively, to actuate the clutch-servo and service brakes upon said speed-responsive control valve returning to normal position to place said working chambers in communication with each other in consequence of the pump operation being interrupted by engine stoppage.

6. In a dual-cylinder hydraulic actuator adapted for use to control the main clutch and service brakes of a motor vehicle and the like powered by an engine, and which is characterized by a pair of cylinders, a fluid supply reservoir for said cylinders, a pair of piston units protractible in said cylinders, respectively, for pressurizing the fluid in their respective working chamber therebetween. a discharge port for the working chamber of one of the cylinders, another discharge port for the working chamber of the other cylinder, a compensating port normally open between the reservoir and working chamber of said one cylinder when said piston units are in normally retracted position, an intake port connecting said reservoir fluid and both piston units behind their respective working chambers, a clutch-servo for disengaging said clutch, a plurality of wheel cylinders for actuating said service brakes, and an engine-driven hydraulic pump having an intake and a discharge port, the improvement which comprises: a fluid conduit connecting said pump discharge port, clutch-servo and first-named discharge port; another fluid conduit connecting the working chamber of said other cylinder and said wheel cylinders; power control means including a control port in the one cylinder and a cooperating control land on the piston unit operably disposed in said one cylinder to block said control port to interrupt return fluid flow through the latter cylinder into said reservoir, and thereby inducing pressure build-up in the fluid conduit between said pump discharge port and said clutch-servo; fluid-passageway means between said first-named discharge port and said control port; and an operator-operated member operable from normal position wherein said piston units are fully retracted to take the service brakes off, and accommodating firm engagement of said clutch, through first and second ranges of movement to activate said power control means to control power-disengagement of said clutch and to subsequently close said compensating port to enable operator-actuation of said service brakes, respectively.

7. In an hydraulic actuator for use in controlling the main spring-engageable clutch of a motor vehicle or the like powered by an engine, and which comprises: a fluid supply reservoir, a fluid working cylinder in which a piston is protractible to control power-disengagement of said clutch, automatic re-engagement thereof, and the conditioning of said working cylinder to pressurize the fluid therein under operator-actuation of said piston to effect clutch disengagement independently of power control thereof, a passage between said reservoir and a portion of said working cylinder, a discharge port for said working cylinder, an engine-driven hydraulic pump having an intake port and a discharge port, a clutch-servo for disengaging said clutch, a fluid conduit connected from said discharge port to said clutch-servo, power control means including a control port in the working cylinder and a cooperating control land on said piston operable in said working cylinder to block said control port to interrupt return fluid flow through said working cylinder into said reservoir, and thereby inducing pressure build-up in said fluid conduit to actuate said clutch-servo to disengage said clutch in response to initial operation of said piston, additional operation of said piston being effective to dispose said control land with respect to said control port to open the same to release said pressurized fluid in said fluid conduit to discharge into said reservoir for automatic re-engagement of said clutch under said spring-actuation; another control land on said piston in longitudinally spaced relation to said first-named control land for connecting said control port to said working cylinder and isolating the same from the reservoir fluid to enable said piston to pressurize fluid in said working cylinder and to displace the same through said discharge port to actuate said clutch-servo to disengage said clutch when said pump is inoperative; and an operator-actuated member movable from normal position wherein said piston is fully retracted to accommodate firm clutch engagement as a function of said control port being unblocked, through first, second and third ranges of movement to protract said piston to control said clutch operation in the sequence stated.

8. In a dual-cylinder hydraulic actuator comprising a pair of concentric overlapping cylinders for controlling the main clutch and service brakes of a motor vehicle or the like; a fluid supply reservoir for said cylinders; a clutch-actuator; wheel cylinders for actuating said service brakes; a piston unit reciprocably disposed in the outer cylinder to produce actuating fluid under pressure and displace the same to the exterior thereof; a valve-forming and fluid-displacing inner piston unit reciprocably disposed in the inner cylinder; a one-way mechanical connection between said piston units effective to impart unitary movement thereto; a discharge port for said outer cylinder; another discharge port for said inner cylinder; a conduit interconnecting the discharge port for said outer cylinder with said wheel cylinders to actuate said service brakes; another conduit interconnecting the discharge port for said inner cylinder to convey actuating fluid under pressure to said clutch-actuator to control hydraulic-power activation of said actuator, and to displace fluid therefrom to actuate said actuator in cooperation with fluid displacement from said outer cylinder in actuating said wheel cylinders to apply said service brakes; a hydraulic pump for producing said actuating pressurized fluid; means for operating said pump; fluid passage means interconnecting the discharge port for the inner cylinder with a control port incorporated in the latter; a control land defining the inner end portion of said inner piston unit, and which is adapted to operably project into said inner cylinder to open and close said control port, closure of said latter port blocking return nonactivating circulation of the fluid by said pump to said reservoir to induce pressurization of the actuating fluid thereby for clutch-actuator actuation; another control land on said inner piston unit spaced from said first-named control land; an annular fluid chamber defined by said space between said control lands, said other control land being adapted to project into said inner cylinder to connect said control port to the interior of said inner cylinder whereby said inner piston unit is effective to pressurize said actuating fluid in cooperation with fluid-displacement from said outer cylinder to actuate said clutch-actuator while the outer piston is effective to maintain the service brakes applied, said first-named control land being effective upon activating hydraulic-power activation of said clutch-actuator to interconnect said control port with said annular fluid chamber to effect release of said pressurized actuating fluid and thereby accommodating automatic deactivation of said clutch-actuator for clutch re-engagement; a pressure-sensitive shut-off valve between said cylinders for isolating them in response to a predetermined pressurization of said actuating fluid by said pump to enable the outer piston unit to function independently of said inner piston unit, to control the wheel cylinders for said service brakes; and an operator-actuated member movable from normal position through first, second and third ranges of movement, to control said piston units simultaneously to effect actuation of said clutch-actuator to disengage said clutch, actuation of said wheel cylinders to apply said service brakes, automatic re-engagement of said clutch, and joint actuation of said clutch-actuator and wheel cylinders to apply said service brakes and disengage said clutch, respectively, in that order, the latter operation being effective when the pump is inoperative to accommodate resetting of said shut-off valve to open position wherein said cylinders are in communication with each other.

9. In a personally-controlled hydraulic actuator characterized by a fluid working cylinder having a fluid supply rservoir, and adapted for use in controlling a clutch-actuator for the main spring-engageable clutch of a motor vehicle or the like, the improvement which comprises: a valve-forming and fluid-displacing unit movable from normal position through first, second and third ranges of movement in said working cylinder to induce actuating fluid under pressure and displace the same to the exterior; a discharge port for said working cylinder; a conduit interconnecting said discharge port with said clutch-actuator to convey actuating fluid to the latter to effect clutch disengagement; power control means incorporated between said unit and working cylinder and comprising a control passage interconnecting said discharge port with the interior of said working cylinder when said unit is in normal position for non-activating circulation of the fluid therethrough into said reservoir, and a control land on said unit adapted to cooperate with said control passage to connect said working cylinder to said reservoir when said unit is in normal position, movement of said unit in said first range being effective to position said control land in overlapping relationship with respect to said control passage to block non-activating circulation of the fluid back to said reservoir for recirculation, and thereby producing pressurized actuating fluid to actuate said clutch-actuator to disengage said clutch, movement of said unit in said second range relative to said working cylinder being effective to position said control land to place said control passage in communication with said reservoir fluid and thereby reestablishing non-activating circulation of said fluid to accommodate automatic re-engagement of said clutch under spring-bias; a second control land longitudinally spaced from the first-named control land to produce an annular fluid space normally comunicating with said reservoir fluid, said second control land being effective upon movement of said unit in said third range relative to said working cylinder to interrupt fluid communication between said fluid space and said reservoir and thereby establishing fluid communication between said control passage and interior of said working cylinder to enable said unit to effect fluid displacement of actuating fluid under presure through said discharge port to actuate said clutch-actuator to disengage said clutch; a single actuatable member for moving said unit from normal position through its third range of movement under personal-control; a hydraulic-pressure producing pump interposed in said conduit to displace fluid under pressure therethrough; a suction line between said pump and said reservoir for supplying fluid to said pump; and means for driving said pump from a rotatable element of said vehicle.

10. A personally-controlled hydraulic actuator constructed in accordance with claim 9 in which said valve-forming and fluid-displacing unit is processed with a blind end cylindrically walled fluid chamber having an open end in continuous communication with the interior of said working cylinder in coaxial relationship therewith, and a radial port through said cylindrical wall adapted to have continuous fluid communication with the annular fluid space aforesaid on said unit.

11. A personally-controlled hydraulic actuator constructed in accordance with claim 10 in which an intake port is incorporated in the wall of said working cylinder to connect said radial port to said fluid supply reservoir when said unit is in normal position whereby the interior of said working cylinder and fluid chamber in said unit are effective to convey non-activating circulation of said fluid by said pump to said reservoir to enable spring-engagement of said clutch.

12. In a personally-controlled hydraulic actuator characterized by a fluid working cylinder having a fluid supply reservoir therefor, and adapted for controlling a clutch-actuator for the main spring-engageable clutch of a motor vehicle and the like, and by an operator-operated member movable from normal position through first, second and third ranges of movement, the improvement which comprises: a valve-forming and fluid-displacing unit having spaced first and second control lands movable from normal position in said working cylinder to induce actuating fluid under pressure and displace the same to the exterior, respectively, under control of said operator member; a discharge port for said working cylinder; a conduit interconnecting said discharge port with said clutch-actuator to convey actuating fluid to the latter to effect clutch disengagement; a fluid control passage normally open between said discharge port and interior of said working cylinder by virtue of the spaced relation of said first control land when said unit is in normal position for non-activating circulation of the fluid therethrough into said reservoir, movement of said unit in its first range being effective to position said first control land in over-lapping relationship with respect to said control passage to block non-activating circulation of the fluid back to said reservoir for recirculation, and thereby inducing pressurized actuating fluid to actuate said clutch-actuator to disengage said clutch in response to movement of said operator member to a corresponding position in said first range, movement of said unit in said second range relative to said working cylinder under influence of said operator member being effective to position said first control land to place said control passage in communication with said reservoir fluid and thereby re-establishing non-activating circulation of said fluid to accommodate automatic re-engagement of said clutch under spring bias; an annular fluid chamber defined by the space aforesaid between said first and second control lands, and which normally communicates with said reservoir fluid during movement of said unit from normal position through first range, said unit being movable in its third range relative to said working cylinder to position said first and second control lands relatively to said working cylinder whereby fluid communication between said annular fluid chamber and said reservoir is interrupted by the latter control land, and the interior of said working cylinder placed in communication with said control passage via said annular fluid chamber by the former control land to enable said unit to effect fluid displacement of actuating fluid under pressure through said discharge port to actuate said clutch-actuator to disengage said clutch in response to movement of said operator member in third range; a hydraulic-pressure producing pump interposed in said conduit to displace fluid under pressure therethrough to effect clutch disengagement in response to movement of said operator member from normal position into first range; a suction line between said pump and said reservoir for supplying fluid to said pump; and means for driving said pump from a rotatable element of said vehicle.

13. In a personally-controlled hydraulic actuator comprising a pair of fluid working cylinders for controlling the main clutch of an engine-powered vehicle and the like; a fluid supply reservoir for said cylinders; a pair of piston units reciprocably disposed, respectively, in said cylinders to pressurize the fluid therein; an operator-operated member having a normal position and a final range of movement for operating said piston units simultaneously; a discharge port common to both of said cylinders; passageway means between said discharge port and one of said cylinders; pressure-responsive shut-off valve means including an element movable from normal position wherein said passageway means are blocked to a different position wherein the latter means are open to enable said one working cylinder to displace fluid under pressure through said discharge port in response to operation of said operator member in its final range; another passageway means including a control port between said discharge port and the interior of said other working cylinder, said control port being controllable by a valve-forming portion on the piston unit operable in said latter working cylinder during operation of said operator member in its final range, to enable the piston unit in said latter working cylinder to displace fluid therefrom under pressure through said discharge port jointly with the piston unit operating simultaneously in said one working cylinder when said shut-off valve means is in normal position, and thereby effecting disengagement of said vehicle clutch; a fluid conduit system including a clutch-actuator for disengaging said vehicle clutch; a compensating port normally open between the interior of said one working cylinder and said fluid supply reservoir when said operator member is in normal position; and another compensating port incorporated in said other piston unit between the interior of said other working cylinder and said fluid supply reservoir, said latter port being open when said operator member is in normal position to negate fluid displacement by said other piston unit until said operator member is operating in its final range; and means responsive to the speed of the vehicle engine for pressure-activating said shut-off valve means to its different position.

14. In a personally-controlled hydraulic actuator comprising an operator-operated member having a normal position and a first and a final range of movement; a pair of fluid working cylinders for controlling the main clutch of an engine-powered vehicle and the like; a fluid supply reservoir for said working cylinders; a pair of piston units reciprocably disposed, respectively, in said working cylinders to pressurize the fluid therein; a discharge port common to both working cylinders through which said pressurized fluid is displaceable to the exterior of said cylinders when said operator member is operating in final range; passageway means between said discharge port and one of said working cylinders; pressure-responsive shut-off valve means including an element spring-biased to normal position wherein said passageway means are blocked, to a different position wherein the latter means are open to enable said one working cylinder to displace fluid under pressure through said discharge port in response to operating said operator member in its final range; another passageway means including a control port between said discharge port and the interior of said other working cylinder, said control port being controllable by a valve-forming portion on the piston unit operable in said latter working cylinder during operation of said operator member in its final range, to block non-activating circulation of fluid from said other working cylinder into said reservoir and thereby inducing pressurization of the fluid in said other passageway means and discharge port; a clutch-actuator connected to said discharge port and which is actuatable by the pressurized fluid aforesaid induced by blocking said control port to disengage said vehicle clutch in response to first range movement of said operator member; a compensating port normally open between the interior of said one working cylinder and said reservoir when said operator member is in normal position; another compensating port incorporated in said other piston unit between the interior of said other working cylinder and said reservoir, said latter port being open when said operator member is in normal position to negate fluid displacement by said other piston unit until said operator member is operating in its final range wherein both of said working cylinders are capable of jointly displacing fluid through said discharge port to actuate said clutch-actuator to disengage said vehicle clutch when said shut-off valve means are in normal position; and means responsive to the speed of the vehicle engine for pressure-activating said shut-off valve means to its different position wherein cooperative fluid displacement by both working cylinders is negated.

15. In a dual-cylinder hydraulic actuator for use in an engine-powered vehicle and the like to sequentially control hydraulic-power clutch disengagement, automatic clutch re-engagement, and operator clutch disengagement when the vehicle engine is inoperative and comprising an operator-operated member having a normal position and operable through first, second and final ranges of movement to correspondingly activate simultaneously a pair of piston units reciprocably disposed in a pair of fluid working cylinders, respectively, to displace fluid therefrom; a common discharge port for both working cylinders; a fluid supply reservoir for both working cylinders; a pair of compensating ports for said working cylinders, respectively, and which communicate with said reservoir, said ports being normally open to accommodate fluid adjustment flow between said working cylinders and reservoir when said operator member is in normal position; a clutch-actuator hydraulically connected to said discharge port and activatable to disengage said clutch by hydraulic-power in response to first range movement of said operator member; passageway means between said discharge port and a control port communicating with the interior of one of said working cylinders; a valve-forming portion on the piston unit reciprocable in said one working cylinder for blocking said control port and thereby inducing pressure build-up in said clutch-actuator to activate the same, in response to said first range movement of said operator member; a fluid passage in the piston unit reciprocable in said one working cylinder and communicating with the interior of the latter and the compensating port therefor to provide non-activating fluid circulation from the latter working cylinder into said reservoir when said operator member is in normal position; a second valve-forming portion on the piston unit reciprocable in said one working cylinder and which is longitudinally spaced from the first-named valve-forming portion; an annular fluid channel defined by the space between said valve-forming portions, and communicating with said last-named compensating port; an intake port between said reservoir and said piston units and communicating with said annular fluid channel when said operator member is operating in first range, said first-named valve-forming portion being adapted to open said control port in said one working cylinder to reestablish fluid communication between said last-named port and said annular fluid channel and connected reservoir, in response to operating said operator member in second range and thereby accommodating re-engagement of said clutch automatically, said second valve-forming portion being adapted to cooperate with said one working cylinder to interrupt communication of said control port with said reservoir and to establish communication between the latter port and said annular fluid channel and interior of said one working cylinder via said compensating port therefor and fluid passage therein, to enable the piston unit reciprocable in the latter working cylinder to displace fluid under pressure through said discharge port jointly with fluid displacement from the other working cylinder; a pressure-responsive shut-off valve means between said working cylinders for normally isolating them during operator member operation in first and second ranges, said shut-off valve being operable to a different position for placing said working cylinder in communication with each other to enable joint fluid displacement into said clutch-actuator to disengage said clutch in response to operator member operation in its final range; a fluid pressure-producing system including a hydraulic pump driven from a rotating element of said engine to produce said hydraulic-power to disengage said clutch when operating said operator member in first range, a suction line between said reservoir and the intake side of said pump, a pressure line between said shut-off valve means and discharge side of said pump, a main pressure line between said discharge port and said clutch-actuator, a pressure output line between the discharge side of said pump and said main pressure line, a one-way check-valve interposed in said pressure output line, and a pressure-regulator valve interposed in a shunt line between the pressure output line and said suction line.

16. In a combined hydraulic actuator and reservoir for use in operating the main clutch and service brakes of an engine-powered vehicle and the like and an operator-operated member operable from a normal position through first and final ranges of movement; a pair of fluid working cylinders normally having fluid compensating communication with said reservoir; a pair of piston units operable as a unit in said working cylinders, respectively, under operator-actuation from normal position through said first and final ranges of movement; a valve-forming portion characterizing a portion of one of said piston units; another valve-forming portion defining a different portion of said last-named piston unit, and which is disposed in longitudinally spaced relation to the first-named valve-forming portion; an annular fluid channel defined by said longitudinal space and which normally communicates with said reservoir; fluid passage means including a control port incorporated between said working cylinders with said latter port communicating solely with one of said working cylinders and controllable by said first-named valve-forming portion; separate discharge ports for said working cylinders, one of which having continuous communication with said passage means; a blind fluid passage in the piston unit operable in said one working cylinder, with the open end thereof in continuous communication with the interior of the latter cylinder; a port in the last-named piston unit for interconnecting said blind fluid passage with said annular fluid channel; a clutch-actuator for disengaging said clutch; a plurality of wheel cylinders for operating said service brakes, respectively; a fluid conduit between the discharge port for the other working cylinder and said wheel cylinders; another fluid conduit between the discharge port for said one working cylinder and said clutch-actuator; pressure-sensitive shut-off valve means operably incorporated between said working cylinders, and normally under spring-bias to place said working cylinders in communication with each other to enable distribution of pressurized fluid displaced from the other working cylinder through both discharge ports to provide sufficient fluid displacement augmented by the one working cylinder for clutch disengagement and operation of said service brakes solely by said other working cylinder, said shut-off valve means being operable to a different position against its spring-bias to isolate said working cylinders in response to predetermined fluid pressurization; another fluid passage means between said first-named passage means and said reservoir, and which are controllable by said shut-off valve means; a common intake port between said reservoir and both of said piston units; a one-way mechanical connection between said piston units whereby operation of said operator member in first range is effective to dispose said first-named valve-forming portion in overlapping relationship to said control port to block the latter and thereby inducing pressure build-up in said first-named passage means to actuate said clutch-actuator to effect hydraulic-power disengagement of said clutch, operation of said operator member in said final range being effective to position said valve-forming portions so as to connect said control port to said annular fluid channel and isolate the latter from said reservoir, to enable both piston units to jointly displace fluid under pressure into said clutch-actuator to disengage said clutch under operator-actuation, and simultaneously operate the vehicle clutch service brakes from a portion of the fluid displaced from the other working cylinder when the shut-off valve means are under spring-bias in normal position; a hydraulic pump driven from a rotating element of said engine for pressurizing the fluid to effect hydraulic-power disengagement of said clutch; conduit means for connecting the intake side of said pump to said reservoir, and the discharge side thereof to said other fluid conduit; and a pressure conduit interconnecting the discharge side of said pump to said shut-off valve means to operate the same to its different position; and spring means including a normally compressed spring reacting on one of said piston units for biasing both piston units via said one-way mechanical connection toward their respective normal positions corresponding to normal position of said operator member.

17. In a hydraulic actuator for the main clutch and service brakes of an automotive vehicle and the like, comprising a body characterized by a fluid reservoir compartment and a pair of fluid working cylinders provided with separate fluid compensating connections, respectively, with said reservoir compartment; a complementary fluid-displacement member movable in each of said working cylinders to pressurize the fluid therein upon sequential interruption of said compensating connections, one of said members being chambered; an operator-operated member connected to actuate said displacement members as a unit in a pressurizing direction, said latter members being operable from normal position through a plurality of ranges of movement including a first and a final range of movement; separate discharge ports for said working cylinders; a common intake port between said reservoir compartment and said displacement members; a clutch-actuator controllable by one of said working cylinders to disengage said clutch; wheel cylinders for the service brakes, respectively, actuated by the other working cylinder; passage means between said working cylinders and adapted to connect and normally isolate them in response to speed-responsive means operable between two different positions of control, respectively; a valve-forming portion on said chambered displacement member; another passage means between said working cylinders; a control port in said one working cylinder between said valve-forming portion and said other passage means, said latter port being normally open when the operator member and connected displacement members are in their respective normal positions wherein said valve-forming portion is disposed to one side of said control port to provide for non-activating fluid circulation through said one working cylinder into said reservoir compartment, said valve-forming portion on said chambered displacement member being adapted to overlap said control port to interrupt non-activating circulation of the fluid and thereby inducing pressure build-up in said clutch-actuator to disengage the clutch in response to first range movement of said operator member; another valve-forming portion in spaced relation to said first-named valve-forming portion on said chambered displacement member; an annular fluid channel defined by the space between said valve-forming portions; a connecting port in said chambered displacement member between the chamber therein and said annular fluid channel, movement of said operator member in a different range being effective to position said valve-forming portions with respect to said control port and said one working cylinder, respectively, wherein said control port is placed in communication with said annular channel to interrupt pressure build-up in said clutch-actuator and thereby releasing the fluid therein for non-activating flow back into the reservoir compartment to accommodate clutch re-engagement automatically, and the other displacement member being effective simultaneously to operate the service brakes, and movement of said operator member in its final range being effective to move said displacement members as a unit under operator-actuation to position said valve-forming portions wherein said annular channel is isolated from said reservoir compartment by said other valve-forming portion projecting into said one working cylinder without interrupting communication between said control port and said annular channel, to enable said chambered displacement member to displace fluid under pressure from the one working cylinder in cooperation with the other displacement member moving as a unit therewith in the other working cylinder when said speed-responsive valve means are in one of their control positions connecting said working cylinders, to actuate said clutch-actuator to disengage said clutch and to simultaneously apply the service brakes and divert a portion of the fluid displacement by the other displacement member into said clutch-actuator; means for producing pressurized fluid to actuate said clutch-actuator; means for operating said speed-responsive means from a rotating element of said vehicle; and spring means including a normally compressed spring reacting on one of said displacement members to bias both of them toward normal position.

18. In a personally-controlled hydraulic actuator for use in controlling the main clutch and service brakes of an engine-powered vehicle and the like, comprising a body characterized by a fluid reservoir compartment and a pair of working chambers provided with fluid compensating connections, respectively, with said reservoir compartment; a pair of fluid-displacement members reciprocable as a unit in said chambers, respectively, to pressurize the fluid therein upon sequential interruption of said compensating connections, one of said displacement members being chambered in confronting relation to its working chamber; an operator-operated member connected to actuate said displacement members as a unit in a pressurizing direction, said operator member being actuatable from normal position through a plurality of ranges of movement including a first and a final range to correspondingly move said displacement members; separate discharge ports for said working chambers; a common intake port between said reservoir compartment and said displacement members; a clutch-actuator hydraulically connected to one of said working chambers via the associated discharge port therefor, to disengage said clutch; wheel cylinders for the service brakes, respectively, hydraulically connected to said other working chamber via the associated discharge port therefor; passage means between said working chambers; speed-responsive valve means operable between two different positions of fluid flow control for controlling said passage means to connect and isolate said working chambers, respectively, another passage means between said working chambers and communicating at one end with the discharge port associated with the said one working chamber; a valve-forming portion on said chambered displacement member; a control port in communication with the other end of said other passage means and opening into the working chamber associated with said chambered displacement member for control by said valve-forming portion, said latter port being overlapped by said valve-forming portion upon movement of said operator member in first range thereby inducing pressure build-up in said clutch-actuator to disengage said clutch; another valve-forming portion on said chambered displacement member in spaced relation to said first-named valve-forming portion; an annular fluid channel defined by said space between said valve-forming portions on said chambered displacement member; a connecting port in said chambered displacement member between the chamber therein and said annular fluid channel, said first-named valve-forming portion being protractible into the working chamber associated with said chambered displacement member upon movement of said operator member in its final range, to uncover said control port and place the same in communication with said annular fluid channel thereby releasing the pressurized fluid in said clutch-actuator to return to said reservoir compartment with consequent automatic re-engagement of said clutch thus engine braking-power effective to supplement service brake application by the other displacement member when said speed-responsive valve means are operating in their control position wherein said working chambers are isolated; means for producing pressurized fluid to control said speed-responsive valve means and to produce actuating fluid for said clutch-actuator; means for driving said fluid-pressurizing means from a rotating element of said engine; and spring means including a normally compressed spring reacting on one of said displacement members to bias both of them as a unit toward normal position.

19. A dual fluid-pressure producing actuator provided with a pair of fluid-working elements operable as a unit from a normal position wherein static condition of the fluid is effective, respectively, and having a common fluid supply reservoir characterized by static condition, and a source of pressurized fluid, comprising an operator-operated member operable from a normal position through first, second and third ranges to operate said working elements; spring means including a normally compressed spring for biasing said working elements as a unit toward normal position; speed-sensitive control valve means operable between two different positions of fluid-control for controlling said source in part to enable two separate and a joint pressure producing operations, respectively, under control of said working elements; fluid communicating means normally open between one of said working elements and said reservoir; a compensating port normally open between the other of said working elements and said reservoir; hydraulic-power control including a certain pair of a plurality of pairs of fluid-controlling portions, cooperable upon operating said working elements as a unit to a first position to interrupt fluid flow through said fluid communicating means between said source and said one working element to disable fluid communication with said reservoir and thereby inducing pressurized fluid flow external to the latter element and upon operating said working elements as a unit to a second position to close said compensating port, when said speed-sensitive means are operating in one position of fluid-control for controlling in part the aforesaid two separate pressure producing operations, respectively, as a function of said operator member operating in its first and second ranges, respectively, said hydraulic-power control being effective upon a different pair of fluid-controlling portions cooperating in fluid flow interruption through said fluid communicating means to negate fluid communication between said one working element and said reservoir with the aforesaid certain pair of fluid-controlling portions relatively positioned to place one of the latter pair in fluid communication with said fluid communicating means whereby said working elements are fluid connected to effect simultaneous pressurized displacement of fluid from said dual actuator with said speed-sensitive means operating in the other position of fluid-control for controlling the aforesaid joint pressure producing operation in part, as a function of said operator member operating in its third range; and rotatable means for operating said source of pressurized fluid at varying speeds of pressure output.

20. A dual fluid-pressure producing actuator having a pair of pressure discharge outlets and a pair of operably associated fluid-working elements, respectively, said elements being operable as a unit from a normal position wherein static fluid condition is effective, a common fluid supply reservoir characterized by said static fluid condition, and a source of pressurized fluid, comprising an operator-operated member operable from normal position through first, second and third ranges to operate said working elements; spring means including a normally compressed spring for biasing said working elements as a unit toward normal position; speed-sensitive control valve means operable between two different positions of fluid-pressure control for controlling said source of pressurized fluid in part to enable two separte and a joint pressure producing operations, respectively, under control of said working elements; fluid passageway means normally open between one of said working elements and said reservoir to communicate static fluid condition to the latter working element; a fluid-compensating port normally open between the other of said working elements and said reservoir to communicate static fluid condition to the latter working element; hydraulic-power control including a certain pair of a plurality of pairs of fluid-controlling portions, cooperable upon operating said working elements as a unit to a first position to interrupt fluid flow between said one working element and its associated discharge outlet to enable fluid pressurized control under said one working element only, when said speed-sensitive means are operating in one position of fluid-control to control one of the aforesaid separate pressure producing operations in part, as a function of said operator member operating in its first range, said hydraulic-power control being effective upon operating said working elements as a unit to a second position to close said compensating port without negating the aforesaid fluid flow interruption by said certain pair of fluid-controlling portions, and thereby enabling said other working element to control the other separate pressure producing operation in part, in response to operating said operator member in a portion of its second range with the speed-sensitive means operating in said one position of fluid-control, said hydraulic-power control being effective upon operating said working elements as a unit to a third position in a pressure producing direction defining a different portion of said second range to dispose said certain fluid-controlling portions relatively to each other to negate the fluid flow interrupting relationship thereof and thereby restoring said static fluid condition between said one working element and said reservoir via said passageway means to negate said one separate pressure producing operation controllable by said one working element without interrupting the other separate pressure producing operation under control of said other working element; an annular fluid transfer chamber between said working elements and which communicates with one of said certain pair of fluid-controlling portions; an annular valve chamber in said speed-sensitive means between said fluid transfer chamber and said other working element; a port providing fluid communication between said valve chamber and said fluid transfer chamber when said speed-sensitive means are operating in said other position of fluid-control; a pair of transfer passages controllable by said speed-sensitive means for placing said other working element in fluid communication with said valve chamber when said speed-sensitive means are operating in said other position of fluid-control, said hydraulic-power control being effective upon operating said working elements as a unit to a fourth position to dispose a different pair of fluid-controlling portions in fluid flow interrupting relationship, to isolate a portion of said passageway means from said reservoir, and thereby isolating said static fluid condition from said one working element and to position said certain pair of fluid-controlling portions relatively to place said working elements in fluid communication via a different portion of said passageway means, said one of said certain pair of fluid-controlling portions, said fluid transfer chamber, said last-defined port, said valve chamber, and said transfer passages whereby said working elements are conditioned to simultaneously pressurize the fluid and displace the same through their respective discharge outlets, when said speed-sensitive means are operating in said other position of fluid-control for controlling the aforesaid joint pressure producing operation in part, as a function of said operator member operating in its third range in a fluid pressurizing direction; and rotatable means for operating said source of pressurized fluid at varying speeds of pressure output.

References Cited by the Examiner
UNITED STATES PATENTS

| | | | |
|---|---|---|---|
| 2,285,557 | 6/1942 | Berglund | 192—13 |
| 2,324,412 | 7/1943 | Milster | 192—13 |
| 2,325,284 | 7/1943 | Swift | 192—13 |
| 3,203,187 | 8/1965 | Randol | 60—54.6 |

BENJAMIN W. WYCHE III, *Primary Examiner.*

DAVID J. WILLIAMOWSKY, *Examiner*